(12) United States Patent
Avallone et al.

(10) Patent No.: US 10,776,804 B2
(45) Date of Patent: Sep. 15, 2020

(54) METHODS AND SYSTEMS FOR PROVIDING PERSONALIZED INFORMATION TO USERS IN A COMMERCIAL ESTABLISHMENT

(75) Inventors: Curt V. Avallone, Scituate, MA (US); Jacob D. Mark, Newton, MA (US)

(73) Assignees: CUESOL, INC., Quincy, MA (US); AHOLD DELHAIZE LICENSING SARL, Geneva (CH)

( * ) Notice: Subject to any disclaimer, the term of this patent is extended or adjusted under 35 U.S.C. 154(b) by 570 days.

(21) Appl. No.: 12/973,132

(22) Filed: Dec. 20, 2010

(65) Prior Publication Data

US 2011/0087497 A1  Apr. 14, 2011

Related U.S. Application Data (63) Continuation of application No. 09/828,444, filed on Apr. 6, 2001, now Pat. No. 7,856,368.

(51) Int. Cl.
*G06Q 30/02* (2012.01)
*H04W 4/021* (2018.01)
(Continued)

(52) U.S. Cl.
CPC ..... *G06Q 30/0224* (2013.01); *G06Q 20/3224* (2013.01); *H04L 67/18* (2013.01); *H04W 4/021* (2013.01)

(58) Field of Classification Search
CPC ............. G06Q 30/0224; G06Q 30/0222–0224
See application file for complete search history.

(56) References Cited

U.S. PATENT DOCUMENTS

| 4,012,133 A | 3/1977 | Burton |
| 4,868,544 A | 9/1989 | Havens |

(Continued)

FOREIGN PATENT DOCUMENTS

| GB | 2298539 A | 9/1996 |
| WO | 0070504 A2 | 11/2000 |

(Continued)

*Primary Examiner* — Jay Huang
(74) *Attorney, Agent, or Firm* — McDermott Will & Emery LLP (57) ABSTRACT

The present invention provides systems for and methods providing a user in a commercial establishment with personalized information, which can include a personalized shopping list, targeted advertisements, health information, nutritional information, promotional offers, offers on sale items, offers on discounted items, manufacturer's coupons, storewide coupons, information on user specific favorite items, and information on user specific staple items. Also disclosed is a device for and method of providing the precise location of a user in a commercial facility comprising a signal receiver and position calculating system that uses one of biangulation and triangulation techniques. Also disclosed, is a system for and method of providing a user in a commercial establishment with personalized information, which can include targeted advertisements, health information, nutritional information, promotional offers, offers on sale items, offers on discounted items, manufacturer's coupons, storewide coupons, information on user specific favorite items, and information on user specific staple items using the user's precise location with respect to items for purchase in the user's immediate vicinity.

18 Claims, 4 Drawing Sheets

(51) Int. Cl.
*H04L 29/08* (2006.01)
*G06Q 20/32* (2012.01)

(56) References Cited

U.S. PATENT DOCUMENTS

| | | | |
|---|---|---|---|
| 4,882,724 | A | 11/1989 | Vela et al. |
| 4,973,952 | A | 11/1990 | Malec et al. |
| 5,158,310 | A | 10/1992 | Tannehill et al. |
| 5,250,789 | A | 10/1993 | Johnsen |
| 5,287,266 | A | 2/1994 | Malec et al. |
| 5,295,064 | A | 3/1994 | Malec et al. |
| 5,361,871 | A | 11/1994 | Gupta et al. |
| 5,424,524 | A | 6/1995 | Ruppert et al. |
| 5,572,653 | A | 11/1996 | DeTemple et al. |
| 5,630,068 | A | 5/1997 | Vela et al. |
| 5,821,512 | A | 10/1998 | O'Hagan et al. |
| 5,821,513 | A | 10/1998 | O'Hagan et al. |
| 5,918,214 | A | 6/1999 | Perkowski |
| 5,995,015 | A | 11/1999 | DeTemple et al. |
| 6,024,281 | A | 2/2000 | Shepley |
| 6,119,935 | A | 9/2000 | Jelen et al. |
| 6,123,259 | A | 9/2000 | Ogasawara |
| 6,129,276 | A | 10/2000 | Jelen et al. |
| 6,151,677 | A * | 11/2000 | Walter ............... H04W 12/0013 713/183 |
| 6,168,079 | B1 | 1/2001 | Becker et al. |
| 6,185,541 | B1 * | 2/2001 | Scroggie ............... G06Q 20/12 705/14.23 |
| 6,314,406 | B1 | 11/2001 | O'Hagan et al. |
| 6,334,109 | B1 * | 12/2001 | Kanevsky ............... G06Q 30/02 705/14.67 |
| 6,385,592 | B1 | 5/2002 | Angles et al. |
| 6,405,049 | B2 * | 6/2002 | Herrod ............... G06F 1/1626 455/517 |
| 6,434,530 | B1 * | 8/2002 | Sloane ............... G06Q 20/20 235/383 |
| 6,571,279 | B1 | 5/2003 | Herz et al. |
| 6,587,835 | B1 * | 7/2003 | Treyz ............... G06Q 20/12 705/14.64 |
| 6,594,346 | B2 | 7/2003 | Engelke |
| 6,595,417 | B2 | 7/2003 | O'Hagan et al. |
| 6,748,365 | B1 * | 6/2004 | Quinlan ............... G06Q 20/20 705/14.26 |
| 7,573,439 | B2 | 8/2009 | Lau et al. |
| 2001/0010054 | A1 * | 7/2001 | Orii ............... G06Q 30/02 709/201 |
| 2001/0014868 | A1 | 8/2001 | Herz et al. |
| 2001/0035840 | A1 | 11/2001 | Fenton et al. |
| 2002/0002485 | A1 * | 1/2002 | O'Brien ............... G06Q 20/20 705/14.25 |
| 2002/0007304 | A1 | 1/2002 | Kasajima et al. |
| 2002/0025824 | A1 | 2/2002 | Lin |
| 2002/0049628 | A1 | 4/2002 | West et al. |
| 2002/0055924 | A1 * | 5/2002 | Liming ............... G01S 5/0027 |
| 2002/0062251 | A1 | 5/2002 | Anandan et al. |
| 2002/0087405 | A1 | 7/2002 | Barnett et al. |
| 2002/0145984 | A1 | 10/2002 | Babu et al. |
| 2003/0021242 | A1 * | 1/2003 | Drysdale ............... H04W 4/21 370/328 |
| 2003/0201931 | A1 | 10/2003 | Durst et al. |
| 2006/0109238 | A1 | 5/2006 | Lau et al. |
| 2008/0077620 | A1 | 3/2008 | Gilley et al. |
| 2008/0183757 | A1 | 7/2008 | Dorogusker et al. |
| 2010/0131567 | A1 | 5/2010 | Dorogusker et al. |

FOREIGN PATENT DOCUMENTS

| | | |
|---|---|---|
| WO | 0193150 A1 | 12/2001 |
| WO | 0208977 A1 | 1/2002 |

* cited by examiner

METHODS AND SYSTEMS FOR PROVIDING PERSONALIZED INFORMATION TO USERS IN A COMMERCIAL ESTABLISHMENT

BACKGROUND OF THE INVENTION

1. Field of the Invention

The present invention relates to methods, systems, and devices for enhancing shopping experiences, and, more particularly, to methods, systems, and devices that provide users personalized information relevant to a commercial establishment in response to a specific request by a user and/or in response to the precise location of the user with respect to the commercial establishment.

2. Description of the Related Art

In a typical commercial environment, e.g., retail shopping store, users push carts or carry baskets through any number of aisles, adding items to their carts or baskets from the many shelves and/or displays in accordance with a prepared shopping list, in-store advertising or mere fancy. Users spend most of their shopping time negotiating the many aisles; locating various items for purchase; and waiting to checkout at the register. As a result, storeowners are always looking for new ways to make the shopping experience more efficient and enjoyable.

Indeed, to assist users to find items for purchase, storeowners typically locate like items in the same general location as like items and frequently locate complementary goods in relative proximity of related goods. For example, all brands of canned vegetables generally are located in proximity to one another in the same aisle and most likely on the same or an adjacent shelf. Soft drinks and snack foods, which complement each other, are often located in the same aisle but on opposite sides of the aisle.

To further assist users, storeowners provide signs throughout the store, e.g., at each entrance of an aisle, that provide a broad description of the items that are located in each aisle. However, with few exceptions, users still must search store shelves to find a particular item in a virtual sea of items and like-appearing items. Then, once users have located the item for purchase, thrifty, cost-conscious users typically weigh brand loyalty against promotional, sale or discounted items or the generic store brand. Often times, particularly near the end of the sale or promotional period, indicia of promotional, sale or discounted items, e.g., plastic signs that hang from the shelves either above or below the promotional, sale or discounted item, are no longer apparent. As a result, users are not always in the best position to make a fully informed, cost-based decision about which brand of an item to purchase.

Moreover, stores endeavor to foster store loyalty using a variety of promotional programs. For example, some stores provide shopping stamps, which are redeemable for prizes and/or store cards. Store cards entitle a user to receive discounted prices on advertised items at check out. Notwithstanding the monetary benefit to the user, stores also profit from these store cards as stores can use the store card and items purchase to study shopping habits and trends.

Known devices and systems have tried to remedy shopping experience shortcomings with limited success. For example, Ogasawara (U.S. Pat. No. 6,123,259) discloses (i) an electronic shopping system; (ii) methods for tracking a user's location, for organizing a user's movement through the aisles of the store by providing location indicia, and for preparing a list of replenishment, e.g., staple, items; and (iii) a mobile shopping terminal to support the various systems and methods. The shopping system comprises the mobile shopping terminal device, a portable scanner for scanning bar codes, e.g., universal product codes (UPC), on items for purchase, and a radio frequency (RF) transceiver for communicating with the in-store computer, which communicates with an item database. The item database generally holds indicia about items for purchase that include the item's bar code UPC identifier, the price of the item, and the location of the item in the store.

The method disclosed in Ogasawara for tracking a user's location with respect to the store is based on the known location of items in the store. Indeed, the in-store computer determines a user's location by correlating it to the location of an item for purchase that the user has scanned with the scanning device. The system further comprises a means for calculating the distance and direction to a destination item for purchase based on the user's assumed location and the location of the destination item. In some embodiments of the invention, users upload an electronic copy of his or her shopping list, which a program in the computer uses to determine the direction and distance to the item on the user's list that is closest to the user's location. In other embodiments, the system executes a program in the computer that determines the direction and distance from the user's location to a replenishment item that the user regularly purchases and/or to an item included on a user profile.

One problem associated with the Ogasawara patent is that a user's location remains a complete mystery until the user actively scans at least one item for purchase. Indeed, the in-store computer does not and cannot know where a particular user is until he or she has scanned at least one item. Furthermore, the in-store computer does not know the location of a particular user between scanned items. Hence, users still must find their way through store aisles unaided until they locate and scan an item on their shopping list. Another perceived problem is that the invention's feature that uses an uploaded shopping list to determine the direction and distance to the next item on the list requires a user first to upload an electronic copy of his or her shopping list on the in-store computer before shopping. Thus, the Ogasawara system is either not useable by or not efficient for users who do not own a personal computer or other means to create an electronic shopping list, who are in a rush and do not have the time to prepare a shopping list, and/or those whose shopping list includes only a few items for which a list is not necessary.

Johnsen (U.S. Pat. No. 5,250,789) discloses a portable shopping display system and a merchandising system, which communicate with an in-store computer having a plurality of databases. Johnsen also discloses a method of generating a shopping list. The merchandising system provides merchandising information to the user, e.g., discount offers on the scanned or complementary items, discount offers for additional purchases of scanned items, and/or merchandising promotions on the scanned items, in response to scanning the UPC of an item for purchase. Consequently, a shortcoming associated with Johnsen, is that merchandising information is scanner-driven, which is to say that the user must shop actively, scanning every item for purchase. Accordingly, a user receives no merchandising information except for those scanned or complementary thereto.

Johnsen's shopping display system comprises a means for receiving a shopping list; a means for identifying the location of items on that shopping list; a means for organizing the shopping list according to the location of items for purchase on the list in the store; and a means for displaying items on the list. Indeed, once a user has provided an electronic copy of his or her shopping list, the in-store computer, which contains a database of item locations, organizes the shopping list in order of the location of each item in the store. However, organization of one's shopping list does not provide guidance as to the exact location of an item in the store; rather, merely which item on the organized list should be encountered next if the user follows a predetermined route through the store.

Johnsen assumes that all users shop alike, which truly is not the case. For example, some users, as a matter of personal preference, habit or custom, start shopping from the extreme right or extreme left of the store, while others may begin in the middle. Some users progress through the aisles, up one and down the next, in an orderly, logical manner, while others prefer to shop in a more random or haphazard fashion, corresponding to sequence of items as they appear on a user's shopping list. Moreover, the Johnsen invention requires uploading a shopping list, which is either not useable by or not efficient for users who do not own a personal computer or other means to create an electronic shopping list, who are in a rush and do not have the time to prepare a shopping list, and/or those whose shopping list includes only a few items for which a list is not necessary or impractical.

Johnsen discloses further a method for generating a shopping list by scanning UPC's that are provided in a catalog, circular, or printed on a sales receipt from a previous visit to the store. A shortcoming with this shopping list generating method is that most users do not own or have ready access to a bar code scanner. Therefore, most users would have to generate their lists while they are at the store, which is cumbersome for a lengthy shopping list and, moreover, extends the amount of time a user must spend at the store.

Malec et al. (U.S. Pat. No. 4,973,952) discloses a passive, shopping cart display system that displays advertisements, promotions, and/or coupons on a mobile display unit in response to signals from triggering transmitters. The system comprises a display unit, which is connected via a network to an in-store computer, and triggering transmitters, which are scattered throughout the store at discrete locations. The in-store computer continuously updates and downloads product information into the memory of the mobile display units. This product information comprises advertisements, promotions, sales, and/or discount coupons for particular items located in proximity of each of the plurality of transmitters.

More specifically, each transmitter radiates a unique electromagnetic signal, which is detectable only within a discrete zone in the store. Thus, when a shopping cart having a display unit enters a transmitter's zone, a receiver in the display unit intercepts the signal of that transmitter. The signal causes, i.e., triggers, software in the display unit to display the information corresponding to that signal. For example, a transmitter located in the dairy section might trigger a display unit to display an advertisement for cottage cheese or provide a discount coupon for sour cream or mention an ongoing sale for cookies. Consequently, users receive information about specials and promotional items passively, i.e., without first having to actively scan an item or take any other action. In short, the system provides generic shopping information automatically to any and all users who enter a triggering transmitter's zone.

The shopping cart display system disclosed by Malec et al. has some shortcomings, however. Indeed, the information provided is non-discriminating, which is to say that every user receives every advertisement, promotion, sale, and/or discount coupon whenever that user enters a zone and the user's display unit intercepts a triggering signal. Some users may find this bothersome or annoying. Additionally, the Malec system requires a plurality of transmitters, which either must be placed strategically on shelves or ubiquitously in the ceiling of the commercial establishment at great cost.

O'Hagan et al. (U.S. Pat. No. 5,821,513) discloses a similar cart-mountable, portable data display system, which is connected by a network to a base unit. The portable display terminal of the display system acts much like a web browser that communicates using a transceiver. Transmitters and/or transponders disposed at discrete locations throughout the store emit a unique signature pattern in a discrete zone. The transceiver of the portable data terminal picks up this signal when it enters the zone. Furthermore, after a transceiver receives a signature pattern, software associated with the portable display terminal generates a link request to the base unit. Basically, the link request is nothing more than the user's location in the store. Based on the user's location, a base unit transmits advertisements, promotional, sales, and/or discount information pertinent to items for sale in the transmitter's zone to the portable display terminal for display. Like the Malec patent, the O'Hagan invention is non-discriminating and, further, requires strategically locating a plurality of transmitters/transponders on shelves or in the ceiling of the commercial establishment at great cost.

Thus, it would be desirable to provide a system and a method to provide users with personalized shopping lists so that users need not input one or that can be used to supplement or in conjunction with a list input by the user. It also would be desirable to provide a system and method for continuously tracking the precise location of at least one user of a commercial establishment, whose identity is known to a local server. Moreover, it would be desirable to provide a system and method that combine the personalized shopping list with the precise tracking means to provide users with personalized information about promotions, discounts, sales, and/or coupons relating to items for purchase in the immediate proximity of the user.

SUMMARY OF THE INVENTION

The present invention provides devices, systems, and methods to provide to a user in a commercial establishment personalized information relevant to the commercial establishment. In one embodiment of the present invention, knowledge of each user's identity and other personal information such as the user's shopping history/purchasing preferences and/or demographic profile are used to provide to users personalized information, e.g., a personalized shopping list. Personalized information may also include targeted advertisements, health and/or nutritional information, promotional offers, offers on sale or discounted items, manufacturer's or storewide coupons, and information on user specific staple/favorite items. Further, this personalized information is communicated to users in real time for display on a screen-based device and/or provided by voice application. The mechanism by which the personalized information is transmitted to the user is not limited. Indeed, it can be any mechanism that permits the user to receive the personalized information in a commercial establishment in a convenient fashion.

Accordingly, one such system for providing personalized information to users comprises:

at least one database comprising the personalized information;

at least one transmitter for transmitting the personalized information to the user; and at least one receiver for receiving, storing, and displaying the personalized information.

In another embodiment, the present invention provides a system that further comprises a means for providing personalized information in combination with continuous tracking of the user's precise location with respect to items for purchase within the commercial establishment. This embodiment of the present invention is capable of providing predetermined personalized information while users are in proximity of particular items for purchase, which items are associated with the personalized information. Accordingly, such a system for providing personalized information about items for purchase comprises:

at least one database comprising personalized information;

a location tracking system;

at least one transmitter for transmitting the personalized information to the user; and at least one receiver for receiving, storing, and displaying personalized information.

One method of the present invention of providing personalized information to a user in a commercial establishment comprises the steps of (i) providing one or more databases of personalized information; and (ii) transmitting the personalized information contained in the one or more databases to the user. Another method of the present invention further comprises the step of (iii) determining the user's precise location with respect to items for purchase within the commercial establishment.

In one preferred embodiment of the subject invention, a location tracking system is capable of tracking and calculating the precise location of a user with respect items for purchase within the commercial establishment. One preferred location tracking system comprises:

at least one transmitter capable of transmitting position data relating to at least one portable display unit;

at least one receiver capable of receiving position data relating to the at least one portable display unit; and at least one system capable of calculating the precise location of the at least one portable display unit using position data transmitted by the at least one transmitter.

One such location tracking system comprises at least one portable display unit that is in communication with a dedicated radio frequency ("RF") transceiver, which transceiver transmits an RF identification signal; a plurality of transceiver/transponders, which are disposed at discrete locations throughout the commercial establishment, for receiving the RF identification signal and further transmitting the RF identification signal to the location calculating system; and a location calculating system, which is in communication with the plurality of transceiver/transponders, that determines the precise location of each of the portable display units by calculating the distance between the known location of more than one transceiver/transponder and the portable display unit. In accordance with one embodiment of the present invention, this system minimizes the required number of transceivers/transponders that must be disposed at discrete locations throughout the commercial establishment.

In one embodiment, the position calculating system tracks a user's location by a method including the steps of (i) transmitting position data; (ii) receiving position data; and (iii) calculating a user's precise location with respect to a commercial establishment by at least one of biangulation and/or triangulation.

It would also be desirable to provide users with the capability to access the Internet to, e.g., access their e-mail, place a call to family or friends, conduct related or unrelated electronic commerce; or to access an in-store intranet to, e.g., order items from the deli department and/or pharmacy, contact customer service, find an item's location in the establishment, and/or participate in in-store raffles, surveys, drawings, games, sweepstakes, auctions, etc. It would be equally desirable to provide users with an in-store message system that alerts them when, e.g., a prescription, deli order or any special order item is ready for pick-up.

In at least one embodiment of the present invention, a server that communicates with the at least one database, which database(s) contains personalized shopping information about the user, communicates with a plurality of portable display units via. The server further (i) identifies each user when the user either manually provides a personal identification number and associated passphrase using a user interface or, alternately, inserts a loyalty card in a card reader that communicates with the portable display unit; and (ii) accesses the stored personalized shopping information.

The subject invention in a related embodiment further includes at least one remote server and mainframe computer, which preferably connect more than one local, in-store computers in a network. The remote and/or local servers contain a plurality of databases, some of which include, e.g., a list of weekly specials, a list of manager's specials, the location of each item within the store, the UPC bar code identification number and price of each item, the number of items in stock, a list of promotional items, a list of discounted items, a list of manufacturer's coupons, a list of alternative coupons, a database containing each user's personal purchasing habits and preferences, e.g., favorite items and/or brands and staple items, a database containing a demographic profile for similarly situated users, and a database containing uploaded user shopping lists.

One embodiment of a portable display unit of the present invention comprises a microprocessor, having random access memory ("RAM"), read-only memory (ROM), and a user interface, that is in communication with a dedicated RF transceiver. The microprocessor can be mounted on a shopping cart or basket and/or carried by a user.

BRIEF DESCRIPTION OF THE DRAWINGS

For a fuller understanding of the nature and desired objects of the present invention, reference is made to the following detailed descriptions and the accompanying drawings. In the drawings, like reference characters denote corresponding parts throughout the several views.

DETAILED DESCRIPTION OF THE INVENTION AND PREFERRED EMBODIMENTS THEREOF

The system, devices, and methods of the present invention will be described in reference to the drawings. However, the present invention is not limited to the embodiments shown in the drawings.

One embodiment of the present invention comprises a system 100 for providing users of a commercial establishment, whose identities are known, with a personalized shopping list. In the embodiment shown, the system 100 for providing a personalized shopping list comprises a local network that includes one or more portable, screen-based display units 10 for receiving, storing, and/or displaying the personalized shopping list, one or more databases containing personalized shopping information about one or more users, which databases are accessible by a server 30; and a transmitter 65 for transmitting the personalized shopping list 65 obtained from the database(s) to the user. See FIG. 1a. Although a local network is preferred, the subject invention can be practiced equally as well using a remote network including one or more servers disposed remotely from the commercial establishment.

Figures 1A, 1B:
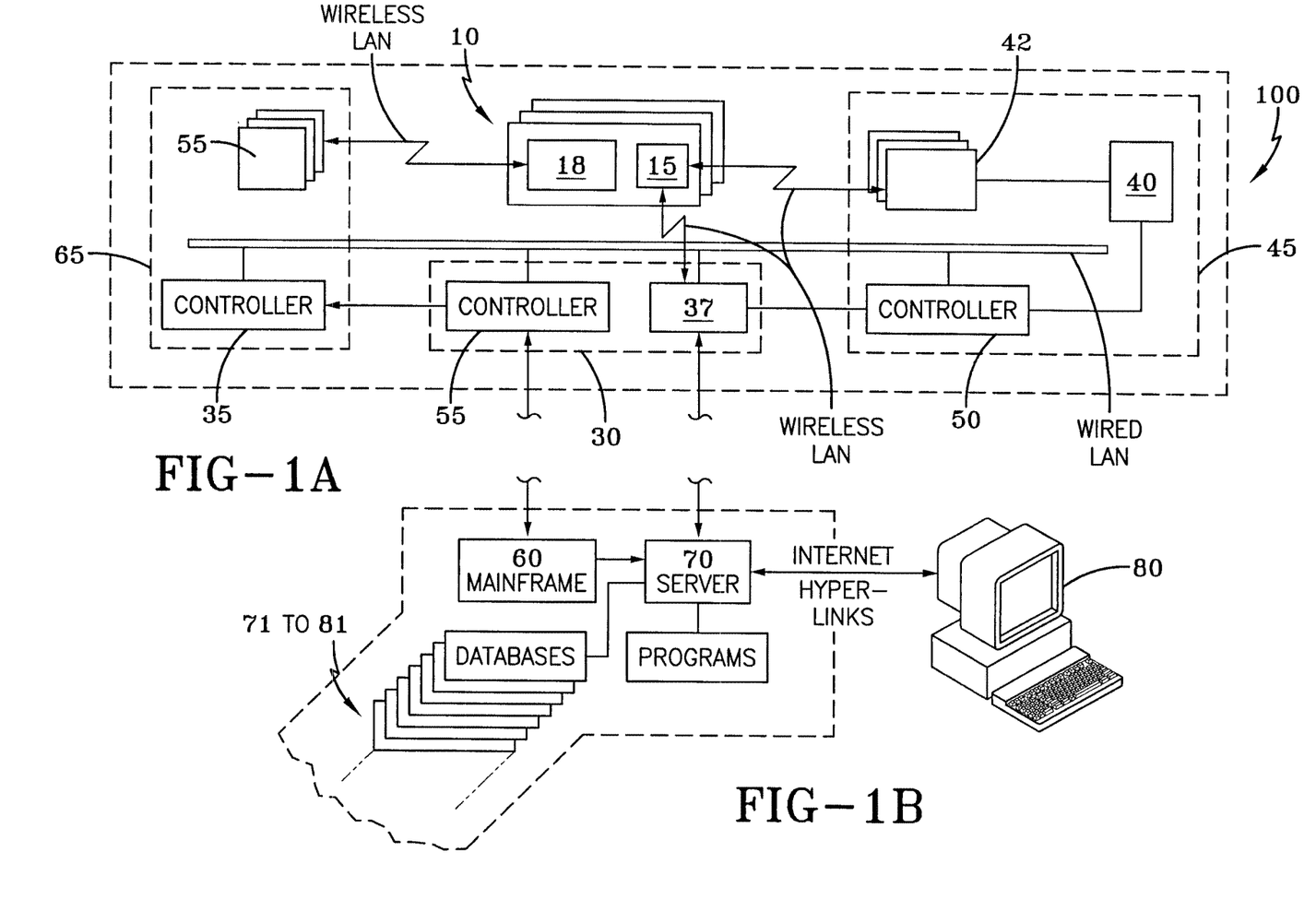
FIG. 1a provides an illustrative embodiment of a system for providing personalized information to at least one user in a commercial establishment.
FIG. 1b provides an illustrative embodiment of a remote system that links a plurality of local systems in a network.

In another embodiment of the present invention, the previously described system further includes a location tracking system 45 for continuously tracking the precise location of each user with respect to the commercial establishment. This embodiment of the system 100 provides users with personalized information, e.g., about items for purchase in close proximity of each user's precise location. The subject invention can be practiced equally as well using a remote network including one or more servers disposed remotely from the commercial establishment.

Preferably, the system 100 for both embodiments includes one or more portable display units 10. In a preferred embodiment, each portable display device 10 is portable and mountable on, e.g., a conventional shopping cart 20 and/or shopping basket (not shown). Another embodiment of the present invention, however, includes a manually transported display device 10, which can be carried in the palm of a user's hand or can be clipped onto a belt or slipped into a shirt pocket.

Each portable display unit 10 serves a myriad of functions performing at least one of the following functions: receives personalized information; stores the information; and displays the information on a display screen 12 in a human readable format. The structure of the display unit 10 comprises a display screen, or panel, 12, and a display screen housing 13. Preferably, enclosed in the housing 13 are a transceiver 14 and related circuitry, an antenna 15 for the transceiver, which is retractably disposed inside the housing 13, having leads (not shown) to connect the antenna 15 to related circuitry, a power source 18, a microprocessor 16, having circuitry and software (not shown) for operating the display device 10, and short-term, i.e., RAM, and long-term, i.e., ROM, memory storage 17 and 21. See FIG. 2.

Figure 2:
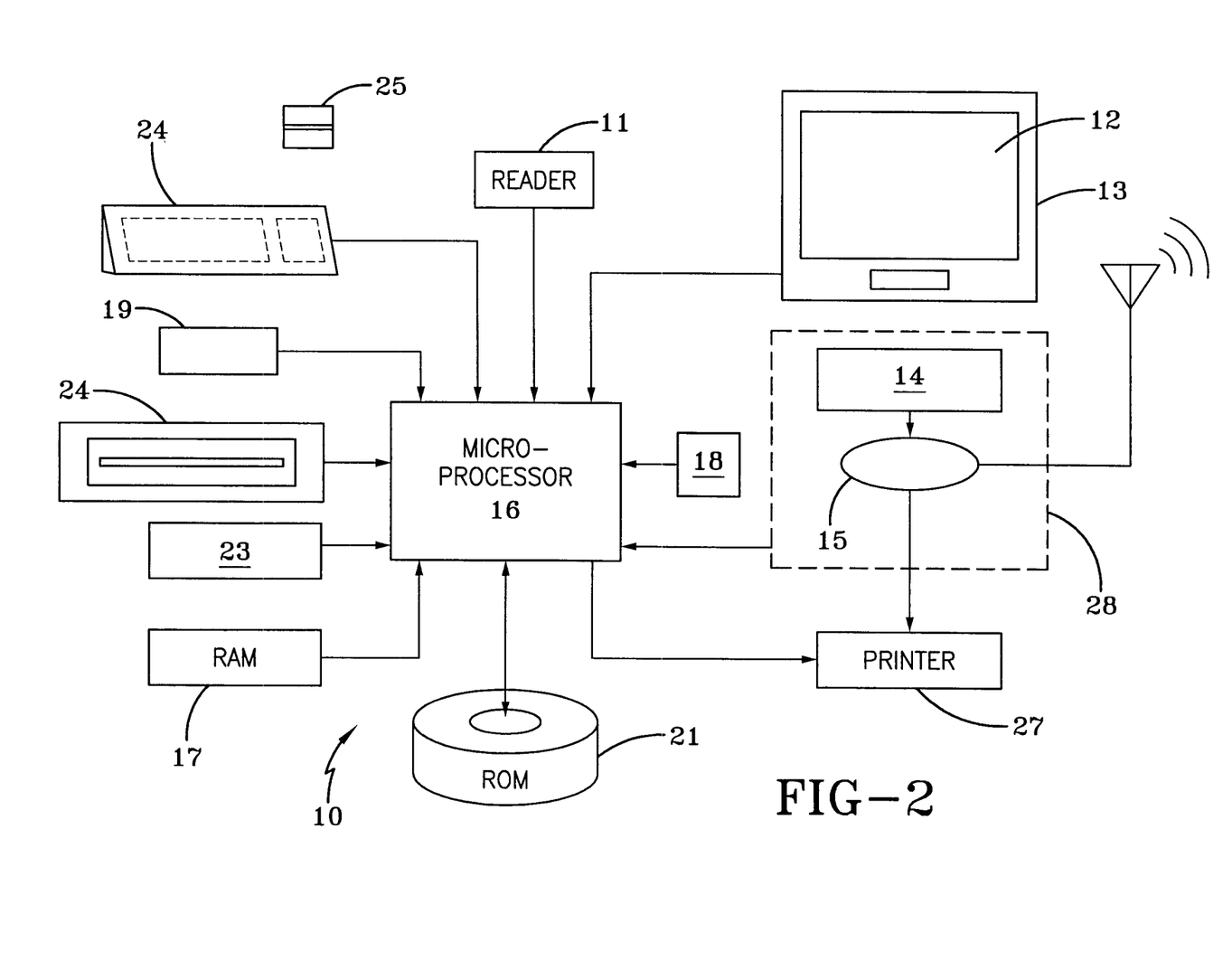
FIG. 2 provides an illustrative embodiment of a portable display unit.

Additional structure of the display device 10 includes a substrate reader 11 for reading loyalty cards 25—which will be discussed in greater detail below; a two-way speaker/microphone system 19 and the circuitry and electronics therefor to provide an audio link between users and, e.g., the commercial establishment's customer service department and/or with one or more first servers 30; a scanning device 23 for reading bar code information about purchase items; a printer 27 for printing out, e.g., discount coupons; and a data portal/disk drive 24, in which users can insert a floppy disk to upload, e.g., a copy of their shopping list.

Preferably, the display screen of the display device 10 comprises a touch sensitive, liquid crystal display ("LCD") panel 12, of a type that is well known in the related art. Numerical or alphanumerical buttons (not shown) can be provided on the display screen 12. In the alternative to touch sensitive buttons, a keyboard 24 that communicates with the microprocessor 16 can be provided. Preferably, the LCD panel 12 is protected by an overlying panel protection layer (not shown), which can be replaced easily from time to time. The protection layer protects the display screen 12 from damage from water of other liquids, scratches, dirt, dust, etc.

These portable display units 10 are capable of communicating remotely with one or more first servers 30 via, e.g., a wireless local area network ("LAN"). Remote communication includes transmitting and receiving information, which will be discussed in greater detail below.

In one embodiment, the first server(s) 30 includes a microprocessor 37, at least one database 71 to 81, and control software 55. See FIG. 3. For example, a listing of databases that can be stored in the first server(s) 70 includes at least one of the following: a list of frequent users to one or more of the commercial establishments 71, a list of user loyalty numbers associated with a loyalty card 25, which is issued to frequent users 72, a list of unique personal identification numbers and passphrases associated with frequent users 73, information about the personal shopping habits and purchasing preferences of each frequent user 74, demographic information about users or groups of users 75, a list of daily, weekly, and/or monthly store specials 76, a list of network-wide daily, weekly, and/or monthly promotional items 77, a list of daily, weekly, and/or monthly store manager's specials 78, a list of manufacturer's discount coupons 79, a list of in-store discount coupons 80, and a list comprising the location of a plurality of items for purchase 81 in the commercial establishment.

Figure 3:
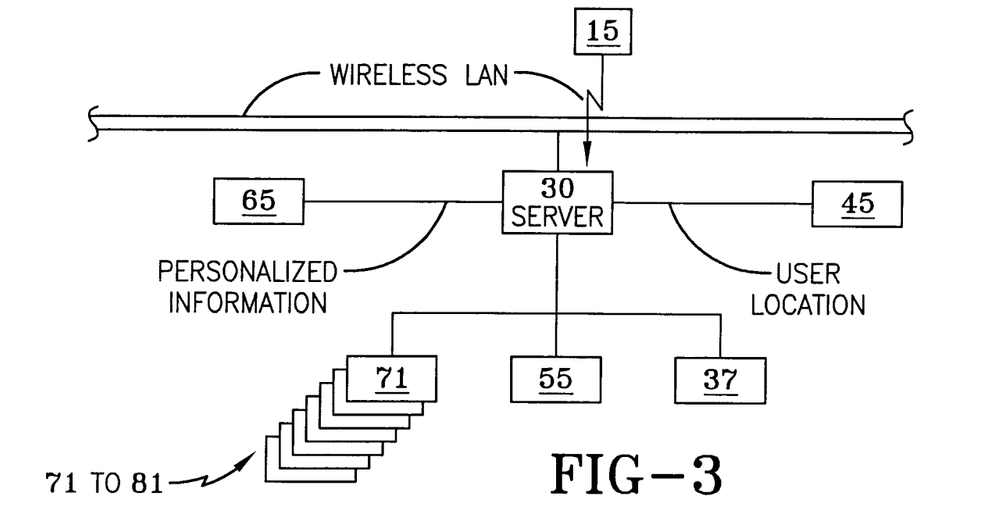
FIG. 3 provides an illustrative embodiment of a local, or first, server.

Preferably, the server's controller 55, which implements a network operating system, enables the first server(s) 30 to (i) access, read from, write to, and/or manipulate personalized information contained in the one or more databases 71 to 81; (ii) communicate with a transmitter 65 that transmits information to the portable display units 10 via a wired LAN; and (iii) communicate with one or more mainframe microprocessor(s) 60, e.g., via a wired LAN, WAN or Internet, which are disposed locally or, more preferably, remotely from the commercial establishment.

The mainframe microprocessor 60 further communicates e.g., via a wired LAN, WAN or Internet, with one or more second servers 70, which similarly are disposed locally to and/or remotely from the commercial establishment. See FIG. 1b. The second server(s) 70 communicates with first server(s) 30, e.g., via a wired LAN, WAN or Internet, disposed in one or more commercial establishments. Additionally, the second server(s) 70 can communicate with one or more home computers 80, e.g., via a wired LAN, WAN or the Internet.

The second server(s) 70 includes a plurality of databases, executable programs, and/or hyperlinks. For example, a listing of databases that can be stored in the second server(s) 70 includes at least one of the following: a list of frequent users to one or more of the commercial establishments 71, a list of user loyalty numbers associated with a loyalty card 25, which is issued to frequent users 72, a list of unique personal identification numbers and passphrases associated with frequent users 73, information about the personal shopping habits and purchasing preferences of each frequent user 74, demographic information about users or groups of users 75, a list of daily, weekly, and/or monthly store specials 76, a list of network-wide daily, weekly, and/or monthly promotional items 77, a list of daily, weekly, and/or monthly store manager's specials 78, a list of manufacturer's discount coupons 79, a list of in-store discount coupons 80, and a list comprising the location of a plurality of items for purchase 81 in each commercial establishment in the network. One or more database contained in the second server(s) 70 is provided to the first server(s) 30 as required.

In a related embodiment, the second server(s) 70 also is capable of providing wireless Internet access and a host of other functions stemming therefrom to users while the users are shopping in a commercial establishment in the network. Indeed, wireless Internet access via the portable display units 10, which units serve as a web browser, permits users to conduct any form of business that presently is conducted on the Internet, e.g., prepare, send, and receive e-mail, participate in e-commerce activities, participate in online reverse bidding auctions, conduct wireless remote telephone call, etc. while the users are in the commercial establishment. Such wireless Internet services are provided to the first server(s) 30 via the second server(s) 70, e.g., using a LAN, WAN, or data line. The first server(s) 30 in turn communicate these wireless Internet services to the user's portable display units 10 via the transmitter 65.

The communication of information from the first server(s) 30 to the portable display units 10 will now be described. Preferably, the information to be transmitted is transmitted by the server's controller 55 to the transmitter 65, e.g., via a wired LAN, WAN, intranet, Internet or data line. A controller 35 digitizes the information and provides it to a plurality of transceivers 55 disposed at discrete locations throughout the commercial establishment. The transceivers 55 transmit the information as a signal, e.g., by wireless LAN, to the appropriate portable display unit 10. The transceiver 14, which is in communication with the portable display unit 10, receives the signal. The portable display unit 10 then stores and/or displays the signal.

Having described the system 100, we will now describe one preferred method for providing users with personalized shopping lists. Each user of a commercial establishment can be identifiable by a personal shopping, or loyalty, card 25, which the commercial facility issues to each user, and/or by a personal identification number ("PIN") and associated passphrase. In obtaining a loyalty card 25 or a PIN, users typically complete one or more questionnaires from which personal information about each user is gathered. This information is used to produce personal shopping histories, i.e., databases, which are linked to the user's loyalty card 25.

In one embodiment for creating personal shopping histories in accordance with the present invention, demographic information relating to the user is used. In one such embodiment, each user is asked to voluntarily complete a questionnaire, which includes questions of a personal nature, e.g., name, age, gender, marital status, number of dependents, town of residence, annual income, occupation. The user's responses to the questionnaire are used to establish one or more user demographic profiles for each user. Moreover, whenever the user makes any purchases, the nature of those purchases are compared with purchases of similarly situated users, i.e., users sharing substantially the same demographic profile. The intent of this comparison is to produce a database of items commonly purchased by, e.g., a plurality of, a majority of and/or all, users similarly situated in a particular profile 75. Such a database is then stored and periodically updated with new common purchase data.

For example, user A enters a commercial establishment in the network and activates a portable display unit 10 using his or her loyalty card 25. Preferably, user A activates the a portable display unit 10 by placing the card 25 in or passing/sliding it through a reader 11, which is in communication with the microprocessor 16 of a portable display unit 10. It should be noted that the disclosed invention can be practiced equally as well if, instead of placing a loyalty card 25 in a reader 11, the user inputs his or her PIN and associated passphrase into a user interface, e.g., touchscreen 12 or keyboard 24, provided therefor. Moreover, in another embodiment, a passphrase can be required in combination with the loyalty card 25 procedures.

The reader 11 transmits the information contained on the user's loyalty card 25 to the microprocessor 16 of the portable display unit 10. A control algorithm causes the information to pass to a remote communication means 28 that comprises a transceiver 15, which is capable of transmitting and receiving signals, and an antenna 14. Preferably, the transceiver 15 transmits the user's loyalty card 25 information along with the portable display unit's 10 unique, e.g., radio frequency ("RF"), identification tag 18, to the first server(s) 30.

It should be noted that each portable display unit 10 has a unique RF identification tag, which permits the first server(s) 30 to transmit information to as few as a single portable display unit 10 rather than to all portable display units 10.

The first server(s) 30 receives the loyalty card 25 and RF identification tag 18 information transmitted by the transceiver 15. The server's controller 55 uses the loyalty card 25 information to identify the user and, moreover, one or more database addresses in memory corresponding to the user's demographic profiles. The server reads data from applicable database addresses containing, e.g., user A's personal shopping history and purchasing preferences 74 and one or more databases containing demographic information about similarly situated users 75.

The controller 55 then causes the data contained in the recalled addresses to be written in, e.g., the server's random access memory (RAM) 17. The information contained in the server's RAM 17 now can be sorted to produce personalized information, e.g., a shopping list. In this way, the server's controller 55 causes personalized information, e.g., a shopping list, to be transmitted to the transceiver 14, where, preferably, the received signal is stored and/or displayed on the screen 12 of the portable display unit 10 in a human readable format. In a separate embodiment, the signal can be an audio signal rather than a video signal, in which case the signal would be broadcast through a microphone/speaker 19 that is in communication with the transceiver 14 and the portable display unit 10.

For example, user B is a single, 30-year old individual, who is employed as an engineer making about $50,000 a year. Based on this profile, user B is grouped in to one or more demographic profiles according to, e.g., his or her age, marital status and gender, profession and annual income, etc. Accordingly, when user B enters a commercial establishment and uses his or her loyalty card 25, the server's controller 55 automatically calls up from memory, i.e., reads, common shopping histories of similarly situated users, i.e., those users who share one or more common demographic profile with user B. Using common demographic information, the first server's controller 55 identifies appropriate shopping list items consistent with user B's demographic profile(s).

For example, items for purchase associated with one of more of user B's demographic profiles can include TV dinners or other prepared meals, beer, frozen pizza, and potato chips, and other such items for purchase that similarly situated users commonly buy. The first server's controller 55 further sorts the information contained in the demographic profiles and causes the microprocessor 16 to write to an electronic shopping list.

The first server(s) controller 55 transmits the electronic shopping list to the transmitter's controller 35 which is transmitted through the plurality of transmitters 55 to user B for display on user B's portable display unit 10. It will become obvious to those of ordinary skill in the art that the possibilities associated with such a controller 55 and system 100 can take on other forms without departing from the scope and spirit of this disclosure.

In another embodiment, a questionnaire includes questions about a user's personal shopping habits, e.g., a list of staple items that the user replenishes frequently, how frequently staple items are replenished, and any name brand items that the user prefers. The server's controller 55 uses the information to produce a base shopping history for each user, which is stored in a database 74. Subsequently, every time a particular user enters a commercial establishment and makes a purchase using his or her loyalty card 25, the nature and date of that transaction are added to the user's base shopping history and re-stored. Over time, each user's shopping history contains sufficient information about the user's shopping habits, i.e., the nature and frequency of his or her transactions, to establish a user shopping history and purchasing preference database 74, which database is used to produce a shopping list for that user.

For example, user C shops at a commercial establishment in the network substantially every week for a year. During that year, after user C has activated the controller 55 in the first server(s) 30 by using his or her loyalty card 25 in a manner described previously, the controller 55 causes user C's shopping history and personal preferences database 74 to be read into RAM 17 and, subsequently, all of user C's typical weekly purchases, e.g., milk, assorted deli meats, baby food, bread, cereal, etc., to be written to the database 74. Furthermore, the server's controller 55 writes to the database 74 those items that the user typically purchases on a monthly basis, e.g., a jar of mayonnaise, a jar of peanut butter, a bottle of ketchup, etc. This weekly and monthly information then is re-stored in the user's shopping history and purchasing preference database 74. Thus, each visit by the user to a commercial establishment updates the database 74. Accordingly, whenever user C enters a commercial establishment in the network and uses his or her loyalty card 25, the controller 35 writes to an electronic shopping list including items user C commonly purchases weekly and/or monthly. This electronic shopping list is transmitted to user C for display on user C's portable display unit 10.

Although, this disclosure has described embodiments for producing a personalized shopping list using (i) demographic information about the user and (ii) the user's shopping history, those skilled in the art will understand that a personalized shopping list can be provided using both demographic information and the user's shopping history in combination or either in combination with another database.

Preferably, access to personal information databases is prohibited until the user's identity has been verified. Indeed, these personal databases 74 and 75 are accessible only after a user introduces his or her shopping card 25 into a reader 11 that is in communication with a portable display unit 10 and/or until after a user introduces his or her PIN and associated passphrase into an interactive, touch-screen display unit 12 located on the portable display unit 10. Personalized shopping, or loyalty, cards 25 preferably include magnetic stripe-type cards; which are well known in the art, and integrated circuit, i.e., "smart", cards, which are also well known in the art, can also be used. For additional security, proper verification of a loyalty card 25 can require users to enter a passphrase after their loyalty cards 25 have been read by the reader 11.

We will now describe an embodiment of a system 100 for providing personalized information to a user of a commercial establishment. Recalling the system 100 described above for providing a user with a personalized shopping list, this embodiment further includes a location tracking system 45. Furthermore, we will describe an associated method of providing personalized information to a user of a commercial establishment that further comprises the step of calculating a user's precise location.

Preferably, each portable display unit 10 previously described communicates remotely with the first server(s) 30 and the location tracking system 45. More preferably, the portable display units 10 communicate with the location tracking system 45 and the first server(s) 30 through a relatively short distance, wireless communication means, e.g., an infrared or, preferably, radio frequency ("RF") link. Communication in this sense comprises (i) sending continuous signals 18 containing position data to the location tracking microprocessor 40, which calculates the precise location of the portable display unit 10; (ii) transmitting to and receiving personal information from the first server(s) 30; and (iii) at least one of storing and displaying data from the at least one server 30 on a display screen, or panel, 12, e.g., as a plurality of web pages using hyper-text mark-up language ("HTML").

Figure 4:
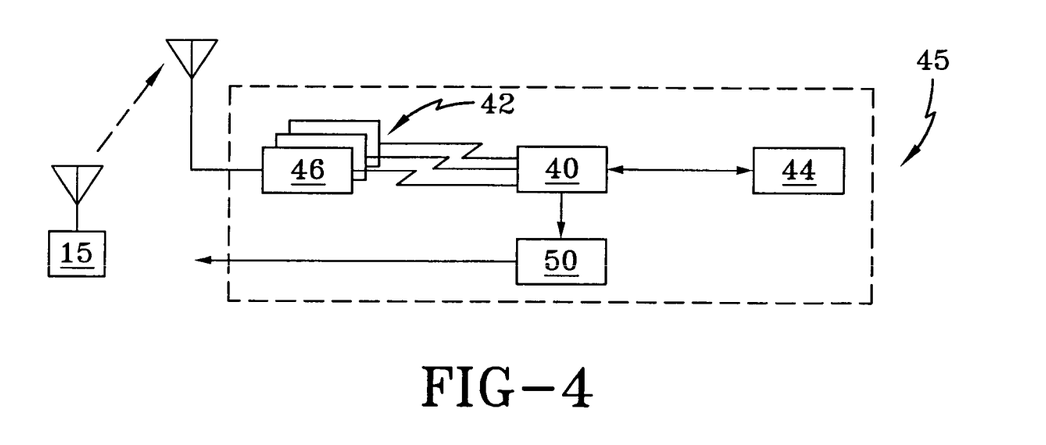
FIG. 4 provides an illustrative embodiment of a location tracking system.

In the embodiment shown in FIG. 4, the location tracking system 45 comprises a receiver 42 for receiving position data from portable data units 10; a position calculating system 40 for calculating the precise location relating to at least one portable display unit 10, and a controller 50 for transmitting position data relating to each portable display unit 10 to the local server(s) 30. For example, the receiver 42 comprises a plurality of, e.g., transceivers or transponders 46 disposed throughout the commercial establishment at discrete locations. It should be noted that the transceivers 55 described previously as part of the transmitter 65 also can be used as the transceivers 46 for the receiver 42 described in this embodiment. Accordingly, a location tracking system 45 comprising transceivers is preferred to one comprising transponders to reduce costs. Henceforth, in this description of the location tracking system 45, will comprise transceivers 46.

Unlike transceiver/transponder systems in the prior art, embodiments of the present invention shown in FIG. 4 require fewer than about a dozen transceivers 46 and preferably about six will suffice. Reducing the number of transceivers 46 substantially reduces the cost of installing the system 100 and, moreover, substantially eliminates the clutter and intrusiveness of the transmitter 46 and receiver 42. Indeed, the transceivers 46 of the present invention do not hang, or drop down, far from the ceiling as prior art transceivers/transponders do.

Preferably, the portable display unit 10 previously described also communicates remotely with a location tracking system 45, e.g., using wireless radio frequency (RF) or infrared (IR) signals. As before, transceivers 14 relating to each user's portable display unit 10 transmit a unique RF identification tag 18, i.e., signal. That signal 18 essentially corresponds to the position data of the user's portable display unit 10 with respect to the commercial establishment, ergo position data of the user him- or herself. It should be noted that precise position location 48 is determinable equally well if the signal is an infrared signal instead of an RF signal.

Preferably, each transceiver 46 is capable of receiving position data emanating from each of the, e.g., RF, transceivers 14 relating to each portable display unit 10. Position data includes the, e.g., RF, identification signal 18, or tag, which is unique for every portable display unit 10 in a particular commercial establishment. The RF identification tag 18 is broadcast continuously at a common frequency.

Transceivers 46 transmit the RF signal 18, i.e., position data, to the location calculating system, i.e., microprocessor 40. The microprocessor 40 calculates the distance from each transceiver 46 to each user's transceiver 14, using software 44 provided therefor, and further determines the precise location of the user by one of triangulation or biangulation, which will be discussed below.

The location calculating microprocessor 40 takes the received signal 18 from a plurality of transceivers 46 and calculates therefrom the distances from the portable display unit 10 to each of the plurality of transceiver 46. Preferably, the precise location relating to each portable display unit 10 is calculated using distances from at least three transceivers 46 so that the software 44 calculates precise location using triangulation techniques. See FIG. 5*a*.

Figure 5A:
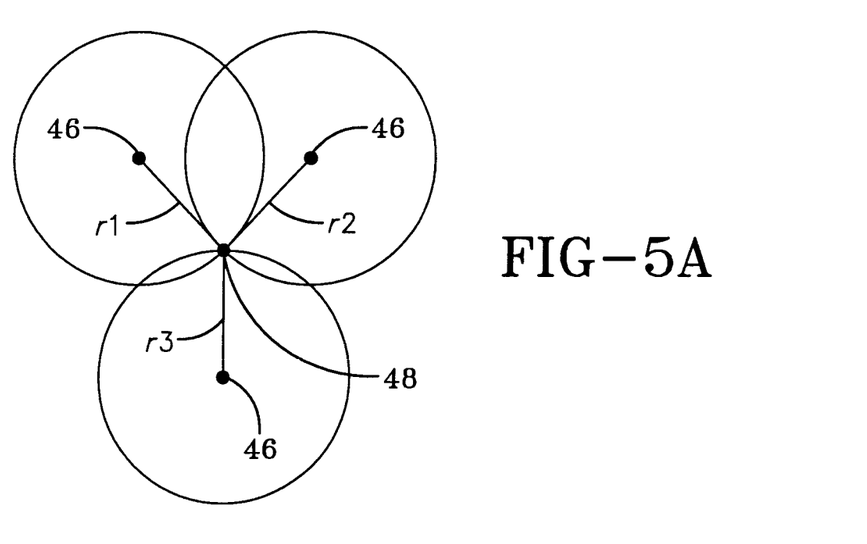
FIG. 5a provides an illustrative embodiment of a method of triangulation using a location tracking system.

For example, triangulation involves calculating a location 48 using the distance from that location 48 to the known location of at least three discrete transceivers 46. As FIG. 5*a* illustrates, the precise location 48 of a portable display unit 10 is the point of intersection of three circles, each circle having a radius, r, corresponding to the distance between the transceiver 46, i.e., the center of the circle, and the portable display unit 10, which is a distance, r, from the transceiver 65, i.e., center. This calculated distance, r, frequently will not be the same for each transceiver 46.

Distance from a transceiver 46 to the user's portable display unit 10 is determined in a manner that is well known in the art. For example, because the transceivers 14 operate, i.e., transmit a signal, at a known frequency, the time measured between two received signals emitted by the same transceiver 14 indicates the distance between the portable display unit 10 and the transceiver 46.

Figure 5B:
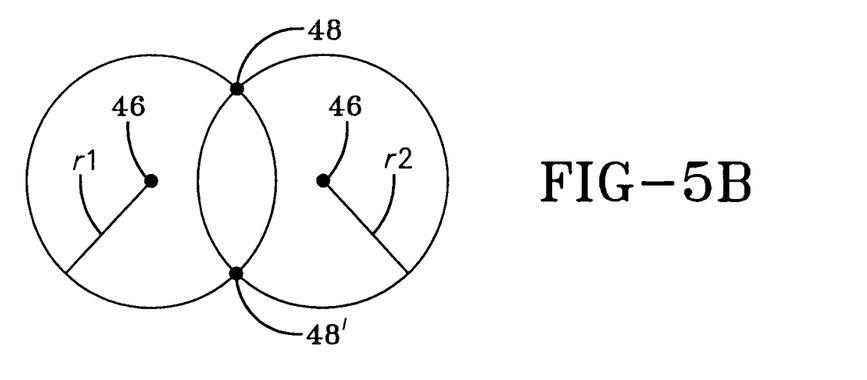
FIG. 5b provides an illustrative embodiment of a method of biangulation using a location tracking system wherein the transceivers are disposed close together.
Figure 5C:
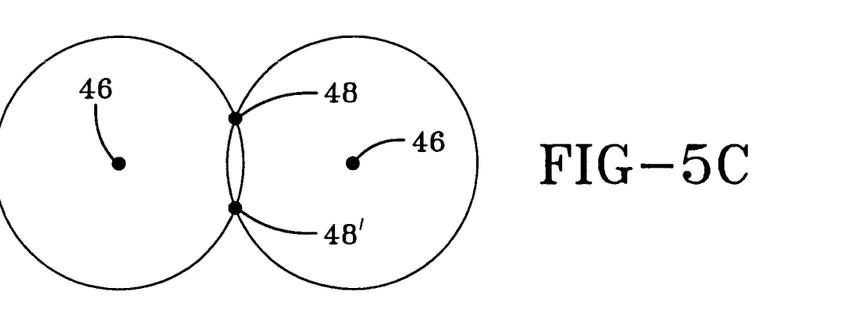
FIG. 5c provides an illustrative embodiment of a method of biangulation using a location tracking system, wherein the transceivers are disposed farther apart.

In a separate embodiment, it is also possible to calculate the precise location 48 relating to each portable display unit 10 using distance information from two transceivers 46 using biangulation techniques. However, as FIGS. 6*b* and 6*c* illustrate, biangulation typically produces two possible locations 48 and 48', which result is less preferable than the one produced by triangulation, but still effective. Error between the two possible locations 48 and 48' is more pronounced when the transceivers 46 are disposed in relatively close proximity of one another as shown in FIG. 5*b*. However, when the transceivers 46 are disposed farther apart from each other, there is less error in associated with the precise locations 48 and 48'. FIG. 5*c*. Hence, having fewer transceivers 46 disposed with respect to each other a greater distance apart helps to minimize possible error in biangulation.

The location tracking unit's controller 50 transmits position data relating to each portable display unit 10 to the first server(s) 30 for use in a manner described previously in this disclosure. Preferably, the server's control software 55 analyzes position data provided by the location tracking system 45 and a user's identity, e.g., from a loyalty card 25, to access one or more personalized shopping information databases. The control software 55 further uses this information in conjunction with a database containing the location of items for purchase in the commercial establishment 81 to sort and transmit personalized information to the known user.

For example, as described previously in this disclosure, the same user A enters a commercial establishment in the network and activates a portable display unit 10 using his or her loyalty card 25, preferably, by placing the card 25 in or passing/sliding it through a reader 11 that is in communication with the microprocessor 16 of the portable display unit 10. It should be noted that the disclosed invention can be practiced equally as well if, instead of placing a loyalty card 25 in a reader 11, the user inputs his or her PIN and associated passphrase into a user interface provided therefor. Moreover, in another embodiment, a passphrase can be required in combination with the loyalty card 25.

The reader 11 transmits the information on the user's loyalty card 25 through the portable display unit 10 to a transmitter 28 that comprises a transceiver 15, which is capable of transmitting and receiving signals, and an antenna 14. Preferably, the transmitter 28 then transmits the user's loyalty card 25 information 25 along with the portable display unit's 10 unique, e.g., radio frequency ("RF"), identification tag 18, to the server(s) 30.

The server(s) 30 receive the information transmitted by the transmitter 28 and, the server's controller 55, using that information to identify databases memory addresses, reads data from applicable database addresses containing, e.g., user A's personal shopping history and purchasing preferences 74 and demographic information about similarly situated users 75.

The controller 55 then writes the data in the recalled addresses in, e.g., the server's RAM 17. In this way the server's controller 55 causes personalized information to be transmitted to the transceiver 14, where, preferably, the received signal is stored and/or displayed on the screen 12 of the portable display unit 10 in a human readable format. In another embodiment, the signal can be an audio signal rather than a video signal, in which case the signal would be broadcast through a microphone/speaker 19 that is in communication with the transceiver 14 and portable display unit 10.

Moreover, the controller 55 also provides a link between user A's aforementioned personal shopping history and purchasing preferences database 74, demographic profile database 75, and the unique RF identification tag 18 associated with the user's portable display unit 10. In this manner, as the location tracking system 45 provides user A's position data with respect to the commercial establishment to the first server(s) 30, the server's controller 55 associates user A's precise location with items for purchase corresponding to that precise location. If a nexus exists between items for purchase in proximity of the user's precise location and the user's demographic profile and/or shopping history and purchasing preferences, then this nexus produces personalized information, e.g., discount coupons on items for purchase that the user is likely to purchase, that appears on the display screen 12 of the display unit 10.

Indeed, the server's controller 55 causes personalized information to be transmitted to the transceiver 14, where, preferably, the received signal is stored and/or displayed on the screen 12 of the portable display unit 10 in a human readable format. Once again, in another embodiment, the signal can be an audio signal rather than a video signal, in which case the signal would be broadcast through a microphone/speaker 19 that is in communication with the transceiver 14 and portable display unit 10.

The personalized information includes e.g., targeted advertisements, health and/or nutritional information, promotional offers, offers on sale or discounted items, manufacturer's or storewide coupons, and information on user specific staple/favorite items for purchase that (i) are in proximity of the user's precise location and either (ii) appear in the user's personal shopping history and purchasing preferences database 74 and/or (iii) appear in the user's demographic profile database 75.

For example, user D shops at a commercial establishment in the network substantially every week for a year. During that year, after user D has activated the controller 55 in the first server(s) 30 by using his or her loyalty card 25, the controller 55 reads user D's shopping history and personal preferences database 74 and writes to the database all of user D's typical weekly purchases, e.g., milk, assorted deli meats, baby food, bread, cereal, etc. Furthermore, the server's controller 55 writes to the database those items that the user typically purchases on a monthly basis, e.g., a jar of mayonnaise, a jar of peanut butter, a bottle of ketchup, etc. This weekly and monthly information then is re-stored in the user's shopping history and purchasing preference database 74. Thus, each visit by the user to a commercial establishment periodically updates the database 74. Accordingly, whenever user D enters a commercial establishment in the network and uses his or her loyalty card 25, the server's controller 55 provides user D with appropriate weekly messages that include, e.g., specials on deli items, discounted coupons on bulk purchase of bread or cereal, price and quality comparisons on baby food. Further, weekly messages include, e.g., a notice of an ongoing buy-one-get-one free sale on and/or coupons for one or more items that user D buys less frequently than weekly, e.g., monthly, to entice user D to purchase the item now to save money.

It will become obvious to those of ordinary skill in the art that the possibilities associated with such a controller 55 and system 100 can take on other forms without departing from the scope and spirit of this disclosure.

Although the present invention has been as described in detail with reference to its preferred embodiments, it should be readily apparent to those skilled in the art that changes and modifications in form and details can be made without departing from the scope and spirit of this disclosure.

What is claimed is:

1. A system for providing personalized information to a user in a commercial establishment, the system comprising:
   a location tracking system in remote communication with a portable display unit manually transported by a user, the location tracking system comprising a microprocessor to determine a precise location of the portable display unit in the commercial establishment with respect to items for purchase within the commercial establishment in response to receipt of an identification tag from the portable display unit;
   a server computer in remote communication with the portable display unit and the location tracking system, the server computer comprising at least one database storing information associated with the user, the location tracking system transmitting the precise location of the portable display unit to the server computer;
   an interface of the portable display unit, the interface receiving user identifying information entered by the user into the portable display unit to activate the portable display unit, the portable display unit transmitting the user identifying information to the server computer, the server computer associating the user identifying information to the user manually transporting the portable display unit;
   a scanning device associated with the portable display unit to read a bar code of an item for purchase in the commercial establishment;
   the server computer comprising a controller, the controller configured to associate the precise location of the portable display unit with items for purchase in proximity to the precise location, the controller configured to generate personalized information for the user in response to a nexus existing between the items for purchase in proximity to the precise location of the portable display unit in the commercial establishment and a shopping history of the user, the personalized information being based on the information associated with the user in the at least one database, wherein the information comprises personal shopping history and preferences of the user and common shopping histories of other users who are grouped with a demographic profile associated with the user;
   the server computer determining a promotion based on a weekly purchasing information associated with the personal shopping history and preferences of the user;
   the server computer storing, in the at least one database, the promotion based on the weekly purchasing information that is determined;
   the server computer transmitting the personalized information to the portable display unit for viewing by the user, wherein the personalized information for viewing by the user comprises an identification of items in proximity to the precise location of the portable display unit in the commercial establishment that appears in the shopping history of the user; and
   the server computer transmitting, to the portable display unit for viewing by the user, the promotion, wherein the promotion includes coupons for one or more items that the user buys less frequently than weekly.

2. The system of claim 1 wherein the interface of the portable display unit is configured to obtain user identifying information from a loyalty card.

3. The system of claim 1 wherein the server computer is in remote communication with an Internet and the server computer provides the portable display unit with access to the Internet through remote connection between the server computer and the portable display unit.

4. The system of claim 1 wherein the at least one database comprises one or more of a list of frequent users to the commercial establishment, a list of user loyalty numbers associated with loyalty cards, a list of unique personal identification numbers and passphrases, information about personal shopping habits and purchasing preferences of users, demographic information about users, a list of store specials, a list of promotional items, a list of manager's specials, a list of manufacturer's coupons, a list of in-store coupons, or a list of locations of items for purchase in the commercial establishment.

5. The system of claim 1 wherein the server computer comprises a first server computer in remote communication with a second server computer, the first server computer being located at the commercial establishment and the second server computer being located remotely from the commercial establishment.

6. The system of claim 5 wherein the at least one database is stored on the second server computer.

7. The system of claim 6 wherein the first server computer and the second server computer are in remote communication using an Internet.

8. The system of claim 6 further comprising a user computer in communication with the second server computer, and wherein the user computer is accessible by the user and located remotely from the commercial establishment.

9. The system of claim 6 wherein the second server computer is in remote communication with a plurality of first server computers located at a plurality of commercial establishments.

10. The system of claim 1 wherein the server computer transmits the personalized information as at least one web page using hyper-text mark-up language to the portable display unit.

11. The system of claim 1 wherein the location tracking system continuously determines the precise location of the portable display unit in the commercial establishment with respect to items for purchase.

12. The system of claim 1 further comprises:
the location tracking system is in remote communication with a second portable display unit manually transported by a second user, the microprocessor of the location tracking system determines a precise location of the second portable display unit in the commercial establishment with respect to items for purchase in the commercial establishment in response to receipt of a second identification tag from the second portable display unit;
the server computer is in remote communication with the second portable display unit, the at least one database of the server computer storing information associated with the second user, the location tracking system transmitting the precise location of the second portable display unit to the server computer;
a second interface associated with the second portable display unit, the second interface receiving second user identifying information entered by the second user into the second portable display unit, the second portable display unit transmitting the second user identifying information to the server computer, the server computer associating the second user identifying information to the second user of the second portable display unit;
a second scanning device associated with the second portable display unit to read a bar code of an item for purchase in the commercial establishment;
the controller configured to associate the precise location of the second portable display unit with items for purchase in proximity to the precise location, the controller configured to generate second personalized information for the second user in response to a nexus existing between the items for purchase in proximity to the precise location of the second portable display unit in the commercial establishment and at least one of a demographic profile of the second user, a shopping history of the second user or personal preferences of the second user, the second personalized information being based on the information associated with the second user in the at least one database; and
the server computer transmitting the second personalized information to the second portable display unit for viewing by the second user.

13. The system of claim 1, wherein the portable display unit comprises a two way speaker/microphone system.

14. A method of providing personalized information to a user in a commercial establishment, the method comprising:
receiving personal information of a user comprising at least the user's shopping history;
storing the personal information of the user in at least one database;
activating, by the user, a portable display unit manually transported by the user upon the user entering a commercial establishment, said activating a portable display unit comprising entering an identifying information related to the user into the portable display unit;
associating the identifying information to the user manually transporting the portable display unit;
determining, with a location tracking system, a precise location of the user in the commercial establishment with respect to items for purchase within the commercial establishment;
generating personalized information for the user in a commercial establishment based on the precise location of the user in the commercial establishment, common shopping histories of other users who are grouped with a demographic profile associated with the user, and at least one of the personal information stored in the at least one database;
determining a promotion based on a weekly purchasing information associated with the personal information of the user stored in the at least one database;
storing, in the at least one database, the promotion based on the weekly purchasing information that is determined;
transmitting the generated personalized information to the portable display unit operated by the user in the commercial establishment, wherein the personalized information comprises an identification of items in proximity to the precise location of the portable display unit in the commercial establishment that appear in a shopping history of the user; and
transmitting, to the portable display unit for viewing by the user, the promotion, wherein the promotion includes coupons for one or more items that the user buys less frequently than weekly.

15. The method of claim 14 further comprising scanning a bar code of an item for purchase in the commercial establishment with the portable display unit.

16. The method of claim 14 wherein generating personalized information comprises determining if a nexus exists between items for purchase in proximity to the precise location of the user in the commercial establishment and the shopping history of the user.

17. The method of claim 14 further comprising displaying, on the portable display unit, the personalized information as at least one web page.

18. The method of claim 14 wherein said entering identifying information comprises entering a passphrase into a user interface of the portable display unit.

* * * * *